United States Patent Office 3,661,944
Patented May 9, 1972

3,661,944
4-(N-LOWER ALKANOYL)HYDROXYLAMINO-4'-AMINODIPHENYLSULFONE COMPOUNDS
Frederick G. Dowalo, Maple Shade, N.J., and Bernard Loev, Broomall, Pa., assignors to Smith Kline & French Laboratories, Philadelphia, Pa.
No Drawing. Filed July 1, 1970, Ser. No. 51,714
Int. Cl. C07c 147/06
U.S. Cl. 260—397.6                    3 Claims

ABSTRACT OF THE DISCLOSURE

The compounds are 4-(N-lower alkanoyl)hydroxylamino-4'-aminodiphenylsulfones having antimalarial activity. A preferred compound is bis[p-(N,O-diacetyl)hydroxylaminophenyl]sulfone.

---

This invention relates to 4-(N-lower alkanoyl)hydroxylamino-4'-aminodiphenylsulfone compounds having antimalarial activity. This activity is demonstrated by administration to mice infected with *Plasmodium berghei* at doses of about 25–400 mg./kg. subcutaneously.

The compounds of this invention are represented by the following formula:

FORMULA I

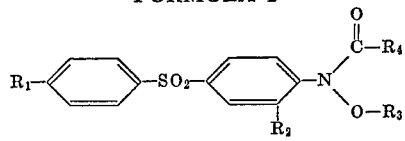

in which:

$R_1$ is $NH_2$, $NH-\overset{O}{\underset{\|}{C}}-R_4$ or 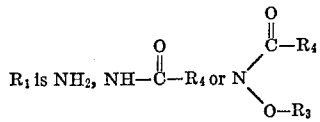

$R_2$ is hydrogen or lower alkyl;

$R_3$ is hydrogen or $\overset{O}{\underset{\|}{C}}-R_5$ and $R_4$ and $R_5$ are lower alkyl or di-lower alkylamino-lower alkylene.

Advantageous compounds of this invention are represented by Formula I above in which:

$R_1$ is 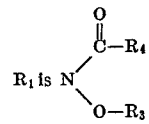

$R_2$ is hydrogen;

$R_3$ is $\overset{O}{\underset{\|}{C}}-R_5$ and $R_4$ and $R_5$ are lower alkyl or di-lower alkylamino-lower alkylene.

A preferred compound of this invention is bis[p-(N,O-diacetyl)hydroxylaminophenyl]sulfone which is represented by Formula I above in which:

$R_1$ is 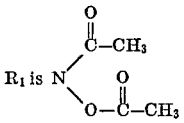

$R_2$ is hydrogen;

$R_3$ is $\overset{O}{\underset{\|}{C}}-CH_3$ $R_4$ is methyl.

The terms "lower alkyl" and "lower alkylene" where used herein denote groups having 1 to 3 carbon atoms.

The compounds of this invention are prepared by the following procedures.

Procedure A

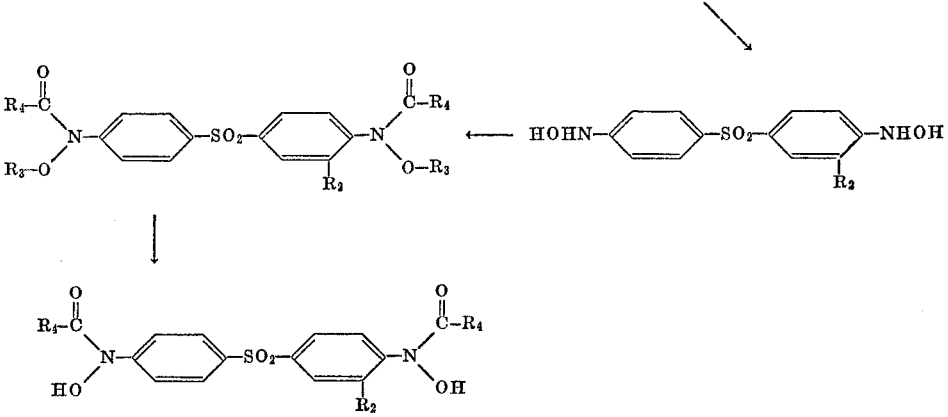

Procedure B

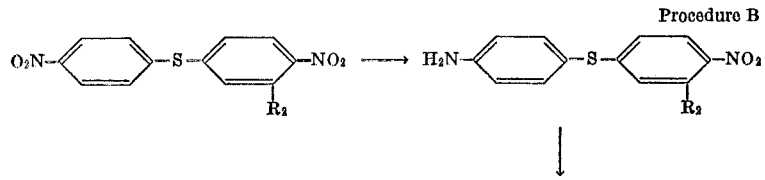

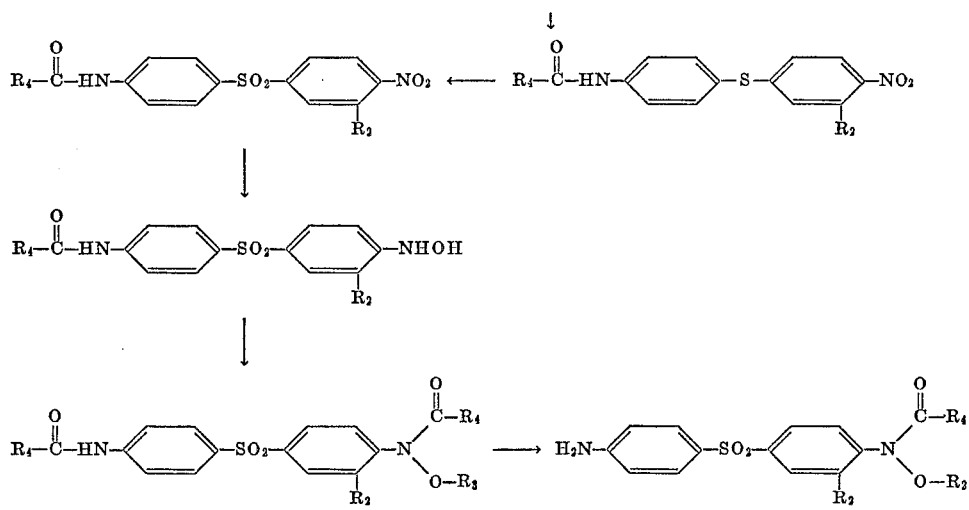

According to Procedure A, the bis[p-(N,O-di-lower alkanoyl)hydroxylaminophenyl]sulfones and bis[p-(N-lower alkanoyl)hydroxylaminophenyl]sulfones of this invention are prepared from bis(p-nitrophenyl)sulfides. The bis(p-nitrophenyl)sulfide is oxidized using, for example, potassium dichromate and a mineral acid. Other oxidizing agents such as hydrogen peroxide in acetone or organic acids, for example nitric acid or periodic acid, may be used. The resulting bis(p-nitrophenyl)sulfone is reduced to the corresponding bis(p-hydroxylaminophenyl)sulfonyl using, for example, zinc dust and ammonium chloride or zinc dust in water or by electrolytic reduction or catalytic hydrogenation or by reduction with aluminum amalgam or sodium sulfide. The resulting bis-(p-hydroxylaminophenyl)sulfone is treated with a lower alkanoylating agent such as a lower alkanoic acid anhydride or a lower alkanoyl halide to give the bis[p-(N,O-di-lower alkanoyl)hydroxylaminophenyl]sulfones of this invention. To prepare the bis[p-(N-lower alkanoyl)hydroxylaminophenyl]sulfones of this invention, the O-lower alkanoyl groups are removed from the bis[p-(N,O-di-lower alkanoyl)hydroxylaminophenyl]sulfones by, for example, treating with ammonium hydroxide or other weakly basic solution.

According to Procedure B, 4-amino and 4-lower alkanoylamino-4'-(N,O-di-lower alkanoyl and N-lower alkanoyl)hydroxylaminodiphenylsulfones of this invention are prepared from bis(p-nitrophenyl)sulfides. One of the nitro groups is reduced, for example, by treating with ammonium sulfide. The resulting 4-amino-4'-nitrodiphenylsulfide is treated with a lower alkanoic acid anhydride or lower alkanoyl halide, for example, acetic anhydride, to give a 4-lower alkanoylamino-4'-nitrodiphenylsulfide or, if the product is to be a 4-unsubstituted amino compound, the amino group is substituted by a protective acyl group, for example a trifluoroacetyl group by reacting the 4-amino-4'-nitrodiphenylsulfide with trifluoroacetic anhydride, which is later removed. The resulting sulfide is oxidized to the corresponding sulfone using, for example, potassium dichromate and a mineral acid and the nitro group is reduced to a hydroxylamino group by treating with, for example, zinc dust and ammonium chloride to give a 4-substituted amino-4'-hydroxylaminodiphenylsulfone.

The 4-substituted amino-4'-hydroxylaminodiphenylsulfone thus obtained is treated with a lower alkanoylating agent, such as a lower alkanoic acid anhydride or a lower alkanoyl halide, to give the 4-substituted amino-4'-(N,O-di-lower alkanoyl)hydroxylaminodiphenylsulfones. When the 4-amino group has a protective substituent, such as a trifluoroacetyl group, this group is removed, for example by treating with dilute ammonium hydroxide, to give the 4-amino - 4' - (N,O-di-lower alkanoyl)hydroxylaminodiphenylsulfones of this invention.

To prepare the 4-amino and 4-lower alkanoylamino-4'-(N-lower alkanoyl)hydroxylaminodiphenylsulfones of this invention the O-lower alkanoyl groups are removed from the corresponding 4'-(N,O-di-lower alkanoyl) compounds by, for example, treating with ammonium hydroxide.

The compounds of Formula I may be used in combination with other antimalarial agents such as cycloguanyl pamoate.

The compounds of this invention also have antileprotic activity as demonstrated by activity against *Mycobacterium leprae* in mice.

The following examples are not limiting but are illustrative of the compounds of this invention and procedures for their preparation.

EXAMPLE 1

A mixture of 30 g. of bis(p-hydroxylaminophenyl)sulfone and 400 ml. of acetic anhydride is heated on a steam bath for 15 minutes. The mixture is then concentrated in vacuo to remove excess acetic anhydride. Ethanol is added and the mixture is concentrated. The residue is triturated with 150 ml. of ethanol, then 600 ml. of water is added. The solid is filtered off and triturated with about 1 liter of chloroform. The mixture is filtered and the filtrate is dried over magnesium sulfate, treated with charcoal, filtered, concentrated and cooled. The precipitate is filtered off and recrystallized from ethanol, then from chloroform-hexane to give bis[p-(N,O-diacetyl)hydroxylaminophenyl]sulfone.

EXAMPLE 2

Bis[p - (N,O - diacetyl)hydroxylaminophenyl]sulfone (4.5 g.) is suspended in 100 ml. of ammonium hydroxide and the suspension is heated on a steam bath, with stirring, for one hour. The resulting solution is then warmed, in vacuo, to remove the excess ammonia, then cooled, neutralized with dilute hydrochloric acid, allowed to stand at room temperature and filtered to give bis[p-(N-acetyl)hydroxylaminophenyl]sulfone.

EXAMPLE 3

Bis(p-nitrophenyl)sulfide (21 g.) is stirred with 200 ml. of saturated ethanolic ammonium sulfide solution for 30 minutes at 50° C. The mixture is then allowed to stand at room temperature for five hours, then concentrated in vacuo and extracted with ethyl acetate. The ethyl acetate solution is extracted with aqueous hydrochloric acid and the extract is made basic with dilute aqueous sodium hydroxide solution and filtered to give 4-amino-4'-nitrodiphenylsulfide.

The above prepared 4-amino - 4' - nitrodiphenylsulfide (10 g.) is dissolved in 200 ml. of acetic anhydride and the resulting solution is heated for 30 minutes on a steam bath. The excess acetic anhydride is removed in vacuo and the residue is recrystallized from isopropanol to give 4-acetamido-4'-nitrodiphenylsulfide.

4-acetamido-4'-nitrodiphenylsulfide (5 g.) is dissolved in 150 ml. of glacial acetic acid at 70° C. The heating is discontinued and a solution of 7.2 g. of potassium dichromate in 80 ml. of water and 70 ml. of concentrated sulfuric acid is added dropwise with stirring over 30 minutes. The mixture is then heated for 15 minutes at 70–75° C., then diluted with 120 ml. of water, cooled to room temperature and filtered. The solid material is triturated in 60 ml. of glacial acetic acid. Filtering gives 4-acetamido-4'-nitrodiphenylsulfone.

The above prepared sulfone (5 g.) is suspended in 100 ml. of 80% aqueous ethanol and 9 g. of ammonium chloride followed by 6.5 g. of zinc dust is added. The mixture is heated at reflux with stirring for 45 minutes, an additional 20 ml. of ethanol is added and the mixture is heated to reflux. The mixture is filtered while hot, then concentrated and treated with water preheated to 95° C. with stirring. Filtering gives 4-acetamido - 4' - hydroxylaminodiphenylsulfone.

Acetylating the above prepared 4-acetamido-4'-hydroxylamidodiphenylsulfone by the procedure of Example 1 gives 4 - acetamido - 4' - (N,O-diacetylhydroxylamino)diphenylsulfone.

EXAMPLE 4

4-amino-4'-nitrodiphenylsulfide (5 g.) is heated with 100 ml. of trifluoroacetic anhydride on a steam bath for 30 minutes. Removing the excess trifluoroacetic anhydride in vacuo and recrystallizing the residue from cyclohexane gives 4-nitro-4'-trifluoroacetamidodiphenylsulfide.

The above-prepared 4-nitro-4'-trifluoroacetamido-diphenylsulfide is oxidized by the procedure described in Example 3 and the resulting 4-nitro-4'-trifluoroacetamidodiphenylsulfone is reduced by the procedure of Example 3 to give 4-hydroxylamino-4'-trifluoroacetamidodiphenylsulfone.

Acetylating the above prepared 4-hydroxylamino-4'-trifluoroacetamidodiphenylsulfone by the procedure of Example 1 gives 4-(N,O-diacetylhydroxylamino)-4'-trifluoroacetamidodiphenylsulfone.

The above prepared 4-(N,O-diacetylhydroxylamino)-4' - trifluoroacetamidodiphenylsulfone (4 g.) is dissolved in 75 ml. of ethanol. The resulting solution is heated to 50° C. and 25 ml. of 1% ammonium hydroxide is added. The mixture is allowed to stand for five minutes, then diluted with ice water and extracted with methylene chloride. The extract is concentrated to give as the residue 4-amino-4'-(N,O-diacetylhydroxylamino)diphenylsulfone.

EXAMPLE 5

5-chloro-2-nitrotoluene (17 g.) in ethanol is added to a refluxing solution of 17 g. of p-nitrothiophenol in 200 ml. of ethanol containing 7 g. of sodium methoxide. The resulting mixture is refluxed for 12 hours. Half of the ethanol is distilled off and the solution is then diluted with four volumes of water. Extracting with ether, then drying and concentrating the extract gives 3-methyl-4,4'-dinitrodiphenylsulfide.

The above prepared 3-methyl-4,4'-dinitrodiphenylsulfide is oxidized to the corresponding sulfone by the procedure of Example 3, the resulting 3-methyl-4,4'-dinitrodiphenylsulfone is reduced by the procedure of Example 3 and the 4,4'-dihydroxylamino-3-methyldiphenylsulfone obtained is acetylated by the procedure of Example 1 to give 4,4'-bis(N,O-diacetylhydroxylamino)-3-methyldiphenylsulfone.

EXAMPLE 6

A mixture of 14 g. of bis(p-hydroxylaminophenyl)sulfone and 17 g. of propionyl chloride in 100 ml. of chloroform containing 20 ml. of N,N-dimethylaniline is heated on a steam bath for 45 minutes. After working up by concentrating in vacuo, extracting with ethyl acetate, concentrating the extract in vacuo and recrystallizing the residue from isopropanol, bis[p-(N,O-dipropionyl)hydroxylaminophenyl]sulfone is obtained.

By the same purocedure using butyryl chloride in place of propionyl chloride, the product is bis[p-(N,O-dibutyryl)hydroxylaminophenyl]sulfone.

EXAMPLE 7

To 80 g. of amalgamated zinc is added 20 g. of 3-chloroacetophenone, then 20 ml. of dilute hydrochloric acid is added. The mixture is stirred while heating at reflux for six hours. The upper oily layer is distilled to give 3-ethylchlorobenzene.

3-ethylchlorobenzene (15 g.) is added slowly to a well-cooled, stirred mixture of 10 g. of nitric acid and 15 ml. of concentrated sulfuric acid. The temperature is allowed to rise to 30° C. and the mixture is poured into ice water. The oily layer is extracted with ether and the extract is dried, concentrated and fractionally distilled to give 5-chloro-2-nitro-ethylbenzene.

By the procedure of Example 5, 5-chloro-2-nitroethylbenzene is reacted with p-nitrothiophenol and the resulting 3-ethyl-4,4'-dinitrosulfiide is converted to 4,4'-bis - (N,O - diacetylhydroxylamino)-3-ethyldiphenylsulfone.

Using 3-chloropropionphenone in place of 3-chloroacetophenone in the above procedure, the product is 4,4'-bis(N,O - diacetylhydroxylamino) - 3 - propyldiphenylsulfone.

EXAMPLE 8

By the procedure of Example 6, bis(p-hydroxylaminophenyl)sulfone is reacted with N,N-dimethylglycyl chloride hydrochloride (prepared by reacting N,N-dimethylglycine with thionyl chloride) to give bis{p-[N,O-di(N,N-dimethylglycyl)]hydroxylaminophenyl}sulfone.

By the same procedure, using in place of N,N-dimethylglycyl chloride hydrochloride the following compounds:

N,N-diethylglycyl chloride hydrochloride
N,N-dipropylglycyl chloride hydrochloride
N,N-dimethyl-β-alanyl chloride hydrochloride
4-dimethylaminobutyryl chloride hydrochloride
4-diethylaminobutyryl chloride hydrochloride (which are prepared by reacting N,N-diethylglycine, N,N-dipropylgylcine, N,N - dimethyl - β - alanine, 4-dimethylaminobutyric acid and 4-diethylaminobutyric acid, respectively, with thionyl chloride) the following products are obtained, respectively:

bis{p-[N,O-di(N,N-diethylglycyl)]hydroxylaminophenyl}sulfone
bis{p-[N,O-di(N,N-dipropylglycyl)]hydroxylaminophenyl}sulfone
bis{p-[N,O-di(N,N-dimethyl-β-alanyl) ]hydroxylaminophenyl}sulfone
bis{p-[N,O-di(4-dimethylaminobutyryl)]hydroxylaminophenyl}sulfone
bis{p-[N,O-di(4-diethylaminobutyryl)]hydroxylaminophenyl}sulfone

What is claimed is:
1. A compound of the formula:

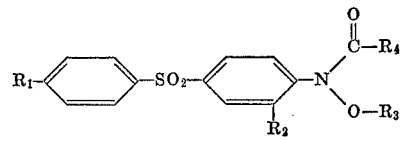

in which:

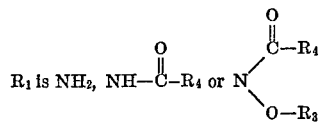

$R_2$ is hydrogen or lower alkyl;

$R_3$ is hydrogen or $\overset{O}{\underset{\|}{C}}-R_5$ and $R_4$ and $R_5$ are lower alkyl or di-lower alkylamino-lower alkylene.

2. A compound according to claim 1 in which:

$R_1$ is $N\genfrac{}{}{0pt}{}{\overset{O}{\underset{\|}{C}}-R_4}{O-R_3}$ $R_2$ is hydrogen;

$R_3$ is $\overset{O}{\underset{\|}{C}}-R_5$ and $R_4$ and $R_5$ are lower alkyl or di-lower alkylamino-lower alkylene.

3. A compound according to claim 1 in which:

$R_1$ is $N\genfrac{}{}{0pt}{}{\overset{O}{\underset{\|}{C}}-CH_3}{O-\overset{O}{\underset{\|}{C}}-CH_3}$ $R_2$ is hydrogen;

$R_3$ is $\overset{O}{\underset{\|}{C}}-CH_3$ and $R_4$ is methyl.

References Cited

UNITED STATES PATENTS

| | | | |
|---|---|---|---|
| 2,260,626 | 10/1941 | Kleiderer et al. | 260—397.6 |
| 2,561,948 | 7/1951 | Rawlins | 260—397.6 |
| 2,589,211 | 3/1952 | Rawlins | 260—397.6 |
| 3,325,521 | 6/1967 | Elslager et al. | 260—397.6 |
| 3,325,522 | 6/1967 | Elslager et al. | 260—397.6 |
| 3,576,872 | 4/1971 | Singhal | 260—397.6 |

NORMA S. MILESTONE, Primary Examiner

S. D. WINTERS, Assistant Examiner

U.S. Cl. X.R.

424—311, 324